United States Patent [19]

Koziol

[11] 4,373,505

[45] Feb. 15, 1983

[54] ADJUSTABLE VENTURI TUBE ASSEMBLY FOR A GAS BARBECUE GRILL

[75] Inventor: Walter Koziol, Antioch, Ill.

[73] Assignee: Modern Home Products Corp., Antioch, Ill.

[21] Appl. No.: 239,999

[22] Filed: Mar. 3, 1981

Related U.S. Application Data

[63] Continuation-in-part of Ser. No. 940,215, Sep. 7, 1978, Pat. No. 4,267,816.

[51] Int. Cl.³ .............................................. F24C 3/00
[52] U.S. Cl. ................................ 126/39 E; 126/25 R; 126/41 R; 431/278
[58] Field of Search ................ 126/25 R, 25 AA, 30, 126/39 E, 40, 41 R, 39 H, 25 A; 431/278; 99/339

[56] References Cited

U.S. PATENT DOCUMENTS

| | | | |
|---|---|---|---|
| 1,394,228 | 10/1921 | Sheridan | 126/25 A |
| 2,121,477 | 6/1938 | Dennis et al. | 126/39 H |
| 2,831,582 | 4/1958 | Cody | 126/30 |
| 3,217,634 | 11/1965 | Fox | 99/339 |
| 3,386,432 | 6/1968 | Hanson | 126/41 |
| 3,498,284 | 3/1970 | Swaddey | 126/41 |
| 3,688,758 | 9/1972 | Stephen, Jr. | 126/41 R |

Primary Examiner—Ronald C. Capossela
Attorney, Agent, or Firm—Neil E. Hamilton

[57] ABSTRACT

A gas venturi tube assembly for a barbecue grill which can be utilized in a wide variety of gas barbecue grill burner elements and base portions. The venturi tube and the gas intake member telescope together in the usual manner. However, adjustable securing mechanisms are provided between the venturi tube and the gas intake member so that the gas intake member is in communication with the gas supply pipe irrespective of the placement of the burner element on the floor of the barbecue grill base. The adjustable securing mechanisms include a screw carried by the gas intake member for engagement with the venturi tube which can also have indented dimples or screw threads disposed in the venturi tube and gas intake member.

13 Claims, 11 Drawing Figures

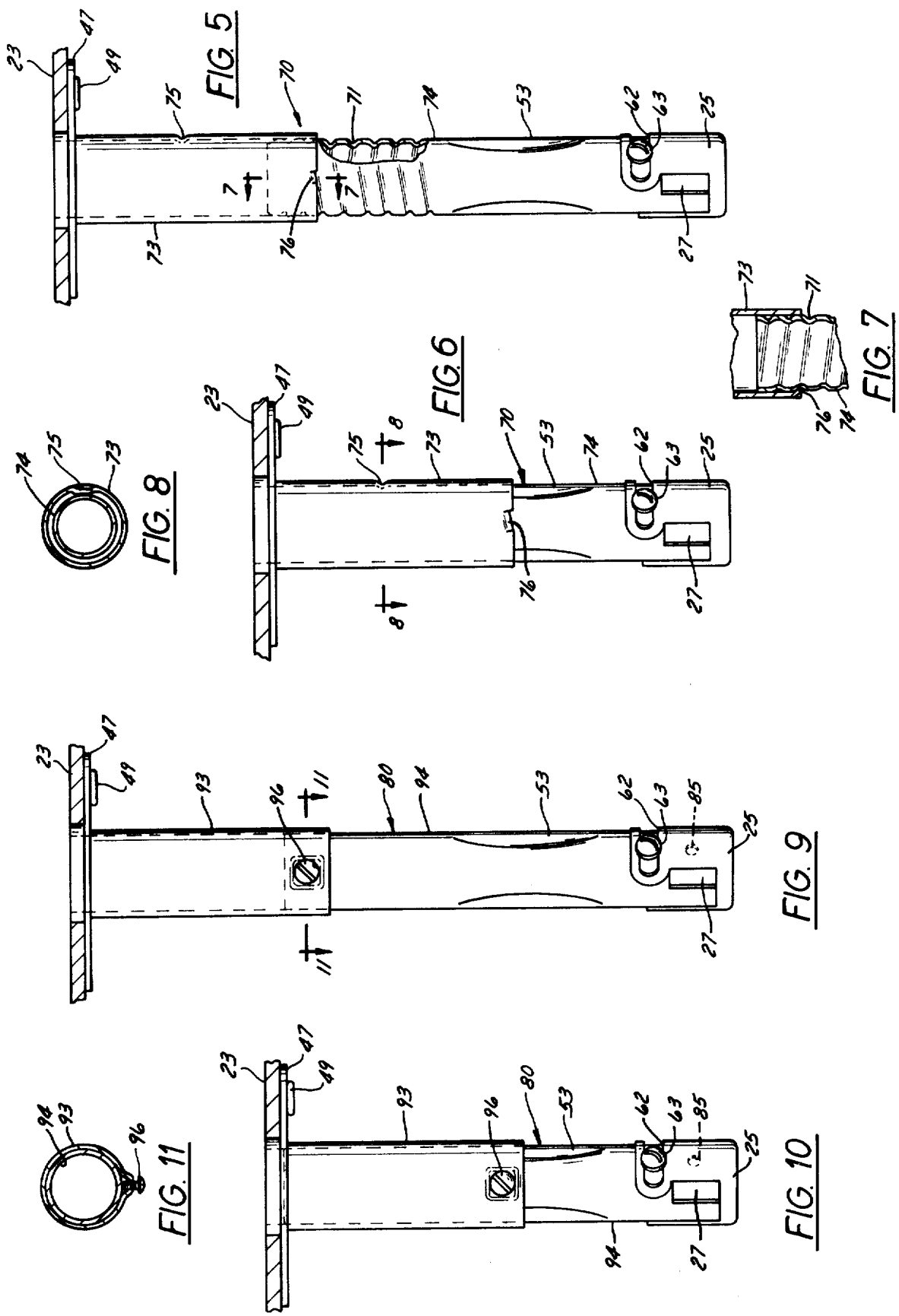

ADJUSTABLE VENTURI TUBE ASSEMBLY FOR A GAS BARBECUE GRILL

CROSS-REFERENCE TO RELATED APPLICATIONS

This application is a continuation-in-part of application Ser. No. 940,215, filed Sept. 7, 1978 now U.S. Pat. No. 4,267,816.

BACKGROUND OF THE INVENTION

This invention relates to a gas venturi tube for a burner element in a barbecue gas grill. More particularly, it relates to an adjustable venturi tube assembly for a gas burner element so that proper connection can be made between the burner element and the gas supply nozzle irrespective of the distance the burner element is supported from the floor in relation to the gas supply nozzle.

Various barbecue grill bases have floors for the burner element located at various positions on the floor and from the gas supply nozzle. Accordingly, it is necessary to construct each gas intake pipe and venturi tube to match the particular distance from the burner element and the gas supply nozzle so that the burner element is in communication with the gas supply pipe. Cost savings could be effected if one venturi tube is fabricated so as to fit in a suitable manner any burner element in a barbecue base portion and provide proper connection with a gas supply.

The state of the art for gas delivery systems for barbecue grills is illustrated in U.S. Pat. No. 3,638,635. A one-piece, nonadjustable venturi tube 64 extends from gas valve 70 to burner 25 and is attached thereto by base 65 and screws 63.

It is an advantage of the present invention to provide a venturi tube for a burner in a gas barbecue grill which can operatively provide connection between numerous gas burner elements in grill base floors and a gas intake nozzle. It is another advantage of this invention to provide an adjustment means between a gas venturi tube and gas supply pipe which can afford positioning of the burner element at various elevations on the floor of the gas grill from the gas supply nozzle. It is still another advantage of this invention to provide secure adjustment between a venturi tube and gas supply pipe in a gas barbecue which will provide quick adjustment without leakage. It is yet another advantage of the present invention to provide a universal venturi tube assembly for a gas grill burner element which can be manufactured and assembled in an economical manner. It is still another advantage of this invention to provide vertical adjustment between the venturi tube and gas intake pipe as well as in the air regulating member.

SUMMARY OF THE INVENTION

The foregoing objects are accomplished by the present burner element and the improved venturi tube assembly for a gas barbecue grill wherein the burner element is defined by the usual hollow, apertured body member having a central portion for receiving a gas intake conduit. A venturi tube in the form of a tubular member has at least one lateral aperture with an air regulating member slidably received by the tubular member at one end thereof to controllably cover the lateral aperture. An opening is defined by the air regulating member adapted to receive a gas supply nozzle. The gas intake conduit is in telescoping relation with the tubular member and rides over the tubular member. Adjustable securing means are operatively associated between the two members so that the tubular member is in fluid communication with the gas nozzle irrespective of the location of the burner on the floor.

BRIEF DESCRIPTION OF DRAWINGS

A better understanding of the present adjustable venturi tube for a burner element will be accomplished by reference to the drawings wherein:

FIG. 5 is a view similar to FIG. 2 showing an alternative embodiment.

FIG. 6 is a view of the FIG. 5 embodiment illustrating the unit in a lowered position.

FIG. 7 is a view in vertical section taken along line 7—7 of FIG. 5.

FIG. 8 is a horizontal view taken along line 8—8 of FIG. 6.

FIG. 9 is a view similar to FIGS. 2 and 5 showing still another embodiment.

FIG. 10 is a view in side elevation of the embodiment of FIG. 9 but in a lowered position.

FIG. 11 is a view taken in horizontal section along line 11—11 of FIG. 10.

DESCRIPTION OF THE PREFERRED EMBODIMENT

Figures 1, 2, 3, 4:
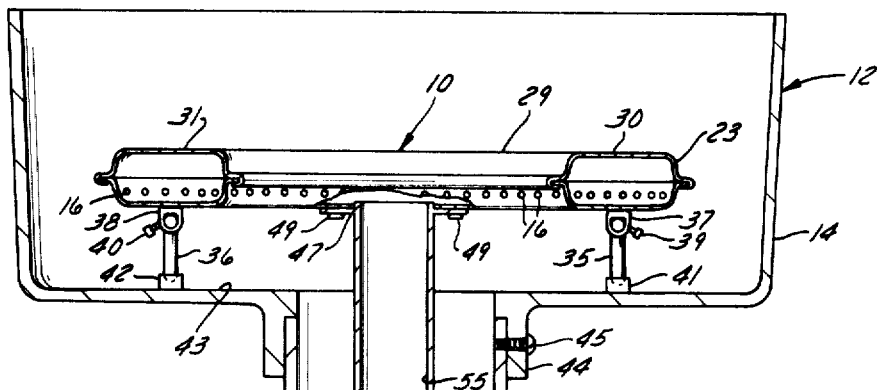
FIG. 1 is a view in partial vertical section of a grill unit showing the adjustable venturi tube and burner element of this invention.
FIG. 2 is a view in side elevation and partially in vertical section of the adjustable venturi tube of this invention.
FIG. 3 is a view similar to FIG. 2 but showing the venturi tube in a lowered position.
FIG. 4 is a view in horizontal section taken along line 4—4 of FIG. 2.

Proceeding to a detailed description of the present invention, a gas burner element generally 10 is shown specifically in FIG. 1 and is utilized in conjunction with the gas barbecue grill unit generally 12. Grill unit 12 has the usual base member 14 and will include the usual grate and cover (not shown) placed over burner 10. Base 14 is supported and secured by the normal post 18 by means of flange 44 and screw 45. Post 18 will carry a gas control 19 and have an air vent (not shown). It will be noted that burner element 10 is formed from a hollow body member 23 having a central portion 29 and four arm portions, two of which are shown at 30 and 31, resulting in an H-shaped configuration with apertures 16. Extending from each arm portion is a leg member such as 35 and 36, which is positioned near the end of the arm portions and in the direction of floor 43. Leg members 35 and 36 are pivotally and extendably secured to the bottom of arm portions 30 and 31 and will contact the foot pads such as 41 and 42 on floor 43 of base member 14. Leg members 35 and 36 are slidably positioned in tubular portions 37 and 38 and fastened by screws 39 and 40. They are described in more detail in U.S. Patent Application Ser. No. 940,215 filed Sept. 7, 1978 by the same applicant now U.S. Pat. No. 4,267,816.

Burner element 10 communicates with the novel venturi tube assembly generally 22 including gas intake conduit 55 and a venturi tube or tubular member 24 with the usual finned section 53. A rotatable air regulator 25 is slidably disposed at one end of tubular member 24 having an adjustable lateral opening 27 the size of which is controlled by regulator 25. This is best shown in FIGS. 1-4. Venturi tube assembly 22 is positioned on control 19 by means of air regulator 25 in the form of a rotatable collar. A gas supply nozzle 57 fed by gas supply line 60 is centered in an opening provided by tubular member 24 and air regulator 25. Gas intake conduit 55 is telescopically placed over and adjustably positioned and secured on tubular member 24 by means of a threaded set screw 51 threadably supported in U-shaped extension 52 of gas intake member 55. Longitudinally disposed on venturi tube 24 are indentations in the form of dimples 50 for engagement with screw 51 to secure venturi tube 24 and gas intake conduit 55 in a fixed position. The usual slot 62 and screw 63 are disposed in air regulator 25 for air adjustment. At the opposite end of the venturi assembly gas intake conduit 55 is operatively connected to burner element 10 by means of flange 47 extending from conduit 55 and rivets 49.

Referring to FIGS. 5-8, an alternative embodiment generally 70 is described. In this embodiment gas intake member 73 includes inwardly positioned shear tabs 75 and 76 to provide internal thread means to threadably engage external threads 71 carried by venturi tube or tubular member 74. This threaded engagement provides an adjustable securing means therebetween.

A further adjustable securing means is described in the embodiment 80 shown in FIGS. 9-11. In this embodiment a screw 96 is carried by gas intake member 93. Screw 96 will be threaded through member 93 to contact venturi tube 94. This embodiment also has an additional adjustment feature in that venturi tube 94 has an adjustment screw hole 85 threaded therethrough in the area adjacent opening 27 for threaded engagement with screw 63. This will provide added height adjustment.

It will be noted in conjunction with the embodiments of FIGS. 5-11 that all of the similar elements described in conjunction with the FIGS. 1-4 embodiment are assigned the same reference numerals An important aspect of this invention is the fact that while longitudinal adjustment is afforded between a gas intake conduit and a venturi tube, the adjustment must be made without any opening in the extended portions of the gas intake conduit or the venturi tube. Further, to assure no leakage between the intake member and the venturi tube, the intake member should telescope or ride over the venturi tube. The adjustable venturi assemblies of this invention accomplish this and provide fluid contact between burner 10 and gas supply nozzle 57 irrespective of the distance the burner 10 is positioned above the floor 43. As indicated earlier, additional telescoping adjustment is provided by adjustment screw 63 positioned in screw hole 85 adjacent opening 27. This feature could be employed with venturi assemblies 22 or 70.

Gas-fired grill 12 is made of cast aluminum whereas the burner element 10 is manufactured from steel. Venturi tube assemblies 22, 70 or 80 are also made from steel and are usually chrome-plated. Screws 51, 63 or 96 are of the machine type. While burner 10 is made in the form of an "H", it will be appreciated that the venturi assemblies of this invention could be utilized with any configuration of burner whether of a straight tube, star-shaped or "figure 8" variety.

It will thus be seen that through the present invention there is now provided a venturi assembly which is fabricated to fit numerous types of barbecue grills irrespective of the distance between the burner element and the gas supply nozzle. The same burner will maintain a parallel position with respect to the grate with the gas intake conduit properly and securely positioned in the venturi tube in various types of gas grill constructions. Various adjustments can be made to properly position the venturi assembly with respect to the gas nozzle and without leakage.

The foregoing invention can now be practiced by those skilled in the art. Such skilled persons will know that the invention is not necessarily restricted to the particular embodiments presented herein. The scope of the invention is to be defined by terms of the following claims as given meaning by the preceding description.

I claim:

1. An improved gas venturi tube assembly for a gas burner element comprising:
    a tubular member defining at least one lateral aperture;
    an air regulator member slidably received by said tubular member at one end thereof to controllably cover said lateral aperture;
    an opening defined by said regulator member adapted to receive a gas supply nozzle;
    a gas intake conduit having an end for operative association with said burner element at one end and in telescoping relationship with said tubular member at the other end; and
    adjustable securing means operatively associated with said tubular member and said intake conduit to secure said conduit and said tubular member in a fixed position.

2. The improved gas venturi tube assembly as defined in claim 1 further including length adjustment means operatively associated with said air regulator member and said tubular member.

3. The improved gas venturi tube assembly as defined in claim 2 wherein said air regulator member is defined by a rotatable collar and said length adjustment means is provided by an adjustment screw threadably positioned through said collar.

4. The improved gas venturi tube assembly as defined in claim 1 wherein said securing means is carried by said gas intake member.

5. The improved gas venturi tube assembly as defined in claim 1 wherein said adjustable securing means operatively associated with said tubular member and said gas intake conduit is defined by a set screw threadably carried by said gas intake conduit and indentations longitudinally disposed in said tubular member.

6. The improved gas venturi tube assembly as defined in claim 1 wherein said adjustable securing means operatively associated with said tubular member and said gas intake conduit is defined by external screw threads carried by said tubular member and complementary internal screw threads carried by said gas intake conduit for operative association.

7. The improved gas venturi tube assembly as defined in claim 6 wherein said internal screw threads carried by said gas intake conduit are defined by shear tabs.

8. The improved gas venturi tube assembly as defined in claim 1 wherein said adjustable securing means operatively associated with said tubular member and said gas intake conduit is defined by a screw member threadably carried by said gas intake conduit and positioned distal to the end operatively associated with said burner element.

9. The improved gas venturi tube assembly as defined in claims 5 and 8 wherein said screw is carried by gas intake conduit by an extension portion.

10. The improved gas venturi tube assembly as defined in claim 1 operatively connected to a gas barbecue grill unit.

11. An improved gas burner assembly for a gas barbecue grill having a floor comprising:
   a burner element;
   a tubular member defining at least one lateral aperture;
   an air regulator member slidably received by said tubular member at one end thereof to controllably cover said lateral aperture;
   an opening defined by said regulator member adapted to receive a gas supply nozzle;
   a gas intake conduit having an end for operative connection with said burner element at one end and in telescoping relationship with said tubular member at the other end;
   adjustable securing means operatively associated with said tubular member and said intake conduit to secure said conduit and said tubular member in a fixed position;
   said burner element including a hollow body member defining a central portion and at least two extending arm portions;
   a plurality of apertures distributed over said body member; and
   a leg member extending from each said arm portion and adjustable to contact said floor.

12. The burner element as defined in claim 11 wherein said leg member is defined by a longitudinal and angular portion extending from each arm portion and in a direction generally transverse of said connection with said gas intake conduit to provide adjustable contact with said floor.

13. The burner element as defined in claim 12 further including means to pivotally attach said leg members to said burner arm portion.

* * * * *